A. T. MARTIN, Jr.
PLOW SHIELD AND CLEANER.

No. 179,122. Patented June 27, 1876.

WITNESSES
Jas. T. Duhamel,
Thomas Byrne,

INVENTOR
Asa T. Martin Jr.
PER
H. T. Abbot.
ATTORNEY

UNITED STATES PATENT OFFICE.

ASA T. MARTIN, JR., OF BUTLER COUNTY, IOWA.

IMPROVEMENT IN PLOW SHIELDS AND CLEANERS.

Specification forming part of Letters Patent No. 179,122, dated June 27, 1876; application filed August 13, 1875.

*To all whom it may concern:*

Be it known that I, ASA T. MARTIN, Jr., of county of Butler and State of Iowa, have invented certain new and useful Improvements in Rotary Plow-Shield and Shovel-Cleaner, of which the following is a specification:

The nature of my invention consists in the construction and arrangement of a rotary corn-plow shield and shovel-cleaner, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
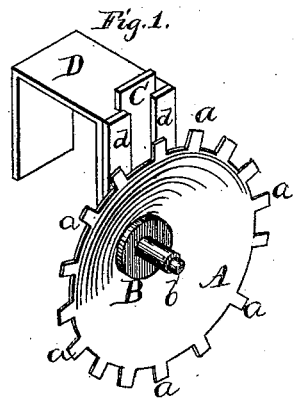
Figure 2:
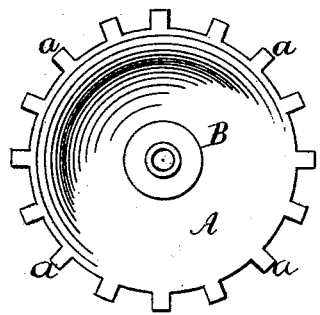
Figure 2:
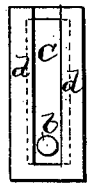
Figure 3:
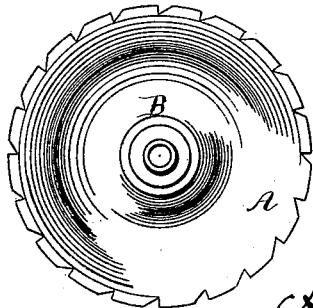

Figure 1 is a perspective view of my invention. Fig. 2 is a detached view of the wheel and holder. Fig. 3 shows a modified form of the rotating wheel.

A represents a circular wheel of any suitable dimensions, made concavo-convex, as shown, and provided around its circumference with teeth $a$ $a$ at regular intervals, which teeth may be either formed with the wheel or made separate and riveted or otherwise attached thereto. In place of the teeth, however, notches may be made in the edge of the wheel to answer the same purpose. In the center of the wheel A is secured a hub, B, which is placed upon a stud, $b$, projecting at right angles from a slide, C, which moves vertically in guides $d$, formed on the outer side of a stirrup, D. This revolving shield comes in contact with the corn in such a manner as not to break, bruise, or hurt it in the least, and at the same time it clears the shovels and plow-standards from all rubbish. With the rolling motion it lifts up all the corn-leaves, allowing the dirt to fall against and hill up the corn. The teeth give greater power to the rolling motion, and catch and remove all the rubbish from the shovels, and the shape of the wheel (concavo-convex) aids in hilling up the corn. The slide C, on which the wheel is mounted, moves freely in the guides $d$, allowing the wheel to adjust itself to any inequalities in the ground over which it passes, making the wheel entirely self-adjusting.

Having thus fully described my invention what I claim as new, and desire to secure by Letters Patent, is—

As a fender attachment for plows, the combination of the gravitating toothed wheel A, hub B, stud $b$, slide C, and stirrup D, with guides $d$, all constructed substantially as and for the purposes herein set forth.

In testimony that I claim the foregoing as my invention I hereunto affix my signature this 4th day of August, 1875.

ASA T. MARTIN, JR.

Witnesses:
    J. C. HODGES,
    JOHN H. HAZLITT.